United States Patent

Izumi et al.

[11] Patent Number: 6,053,583
[45] Date of Patent: Apr. 25, 2000

[54] STABILITY CONTROL SYSTEM FOR VEHICLE

[75] Inventors: Tomoji Izumi, Hatsukaichi; Haruki Okazaki, Hiroshima; Toshiaki Tsuyama, Higashihiroshima; Tetsuya Tachihata, Hiroshima, all of Japan

[73] Assignee: Mazda Motor Corporation, Hiroshima, Japan

[21] Appl. No.: 09/049,126

[22] Filed: Mar. 27, 1998

[30] Foreign Application Priority Data

Mar. 31, 1997 [JP] Japan .................................... 9-081359

[51] Int. Cl.⁷ .................................................... B60T 8/24
[52] U.S. Cl. .................. 303/150; 303/146; 364/426.037
[58] Field of Search .................................... 303/140, 143, 303/146, 147, 188; 701/69, 72, 81, 89; 364/426.016, 426.026, 426.028, 426.035, 426.036

[56] References Cited

U.S. PATENT DOCUMENTS

| | | | |
|---|---|---|---|
| 5,560,690 | 10/1996 | Hattori et al. | 303/146 |
| 5,694,321 | 12/1997 | Eckert et al. | 364/426.037 |
| 5,709,439 | 1/1998 | Monzaki | 303/146 |
| 5,722,743 | 3/1998 | Sano | 303/146 |
| 5,742,917 | 4/1998 | Matsuno | 701/69 |
| 5,782,543 | 7/1998 | Monzaki et al. | 303/146 |
| 5,805,449 | 9/1998 | Ito | 364/424.051 |

FOREIGN PATENT DOCUMENTS 2-151571   6/1990   Japan .

*Primary Examiner*—Chris Schwartz
*Attorney, Agent, or Firm*—Nixon Peabody LLP; Donald R. Studebaker

[57] ABSTRACT

A system of driving stability control, which is adapted to control valves for opening and closing hydraulic pressure passages between a master cylinder and brake units of wheels and simultaneously controls pressurizing valves and a pressure relief valves so as to supply braking force selectively and independently to the brake units when a specified driving condition is detected, performs the coordinated braking control that, when a specified step-on pressure is detected during execution of the driving stability control, delivers the braking pressure to the brake units according to brake pedal travels as the driving intends simultaneously with reducing the participative degree of the driving stability control so as to ensure gripping force of wheels that brake the vehicle and reduces reduce the participative degree of the driving stability control with an intention of regarding driving stability of the vehicle as important when the vehicle is going to cause a spin.

12 Claims, 7 Drawing Sheets

STABILITY CONTROL SYSTEM FOR VEHICLE

BACKGROUND OF THE INVENTION

1. Field of the Invention

The invention relates to a stability control system for an automotive vehicle.

2. Description of the Related Art

In recent years, there is a strong tendency to control stability of an automotive vehicle by controlling braking force applied to four wheels independently. Braking force is applied to one or more wheels so as to gain actually a target yaw rate or a target slip angle of the vehicle given as a target stability parameter based on a steering angle, a vehicle speed, and a yaw rate and a lateral acceleration of the vehicle. This kind of system of driving stability control is known from, for example, Japanese Unexamined Patent Publication No. 2-151571. The system of driving stability control attracts a great deal of attention as a potential safety technique because of its capability of preventing an occurrence of understeering and/or spinning within a limit of tire gripping or adhesion force.

The system of driving stability control of this kind applies braking force to some of the four wheels to cause a yaw moment in the vehicle independently of braking the vehicle. That is, braking force applied to a specific wheel or wheels through the stability control while the vehicle spins or when the slip angle of the vehicle is large bears no direct relation to braking the vehicle. On the other hand, if the driver steps on a brake pedal with the intention of avoiding spin or bringing a spin to the end during execution of the stability control, a confrontation occurs between demands for braking the vehicle and making the vehicle run stably. If either must take preference, measures have to be taken to prevent an occurrence of confrontation between the two demands. Applying braking force simply distributed among the wheels during an occurrence of spin might encourage the spin.

SUMMARY OF THE INVENTION

It is an objective of the invention to provide a system of driving stability control for an automotive vehicle which achieves both braking the vehicle and making the vehicle run stably on a high level with an effect of avoiding an occurrence of a spin.

The foregoing object of the present invention is achieved by providing a system of driving stability control for a vehicle equipped with a braking system for performing braking control and stability control of the vehicle according to vehicle driving conditions by applying braking force independently to respective wheels. The system of driving stability control causes changes a distributive proportion of a braking force between the braking control and the stability control correspondingly to a step-on pressure with which the brake pedal is stepped on by the driver and restrains the braking control by reducing the distributive proportion of braking force when it is judged based on driving conditions that the vehicle is going to cause a spin.

With the system of driving stability control performs coordinated braking and stabilizing control when the brake pedal is stepped during execution of the stability control. If the vehicle encounters a driving condition leading to a spin during the coordinated braking and stabilizing control, the stability control restrains the braking control to prevent the tendency for the vehicle toward the spin. Allowing a margin of slip angle against an occurrence of a spin provides a broad range of driving conditions in which the coordinated braking and stabilizing control The imposing restraint on the coordinated control is achieved simply by a complementary change in distributive proportion of braking force between the braking control and the stability control. When the steering wheel is additionally turned in the same direction, for example, when the steering wheel is further turned right after having been turned right to a certain extent in such a case where the driver drives the vehicle with the active intention of causing a spin for sporty driving, the stability control may be restrained or suspended, which is easily achieved only by increasing the distributive proportion of braking force allocated to the braking control.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
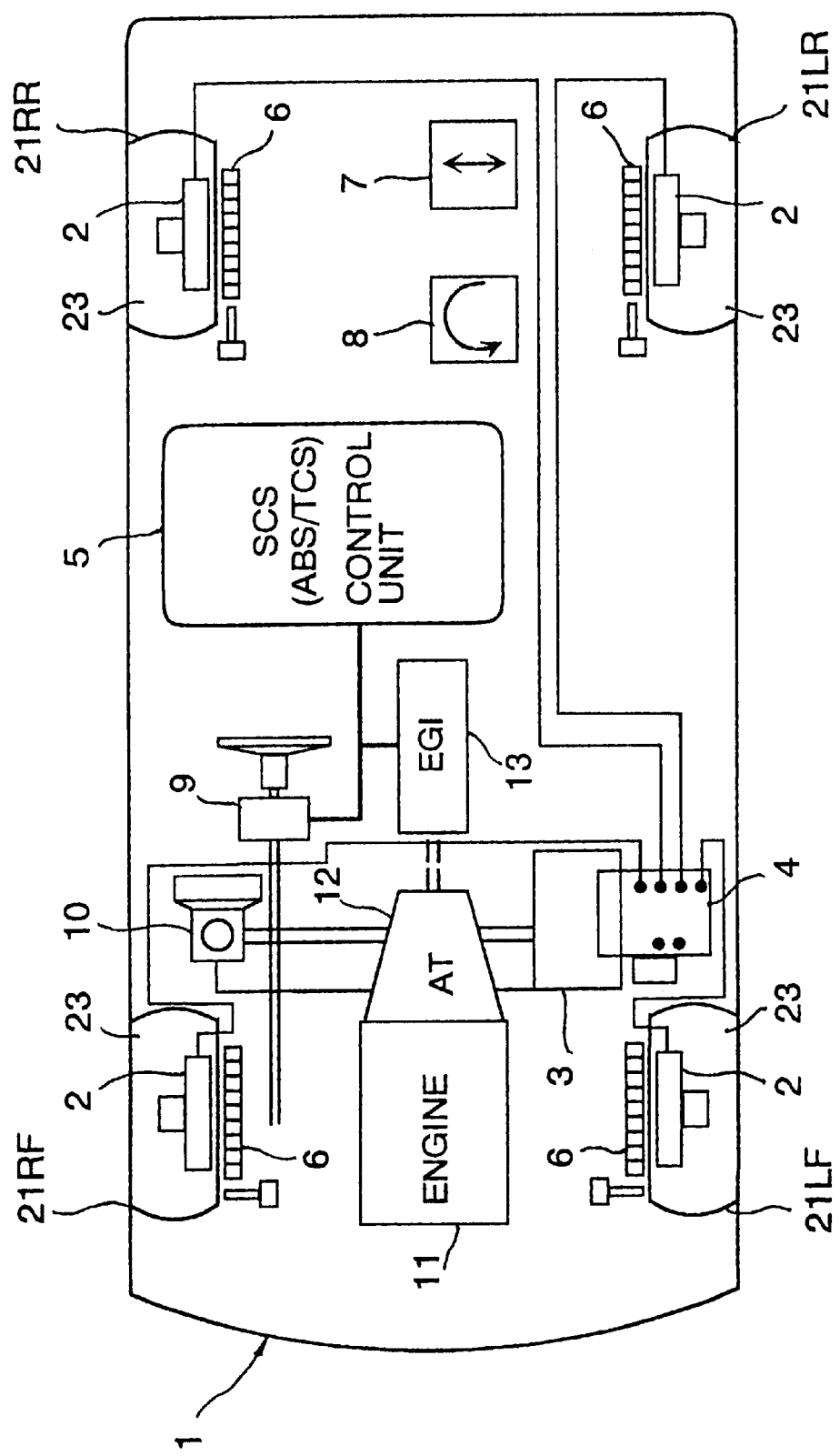
FIG. 1 is a schematic illustration showing an automotive vehicle equipped with an system of driving stability control in accordance with an embodiment of the invention.

Referring to the drawings in detail and, in particular, to FIG. 1 showing an automotive vehicle equipped with a system of driving stability control (DSC) in accordance with an embodiment of the invention, the automotive vehicle 1 has an engine 11 to which an automatic transmission 12 is connected and a braking system accompanied by a brake master cylinder 10. This braking system comprises hydraulic brake units 2 installed to right and left, front and rear wheels 21RF, 21LF, 21RR and 21LR, respectively, and a pressure supply unit 3 for generating and supplying hydraulic pressure to each brake unit 2 through a distributor unit 4. The respective brake units 2 are controlled by means of a stability control unit 5 in cooperation with the pressure supply unit 3 and the distributor unit 4 based on incoming signals from wheel speed sensors 6 for detecting rotational speeds of the respective wheels 21RF, 21LF, 21RR and 21LR, an acceleration sensor 7 for detecting lateral acceleration of the vehicle 1, a yaw rate sensor 8 for detecting a yaw rate of the vehicle and an angle sensor 9 for detecting a steering angle. A fuel injection control unit 13 is installed to control the amount of fuel to be injected according to engine speed and load.

Figure 2:
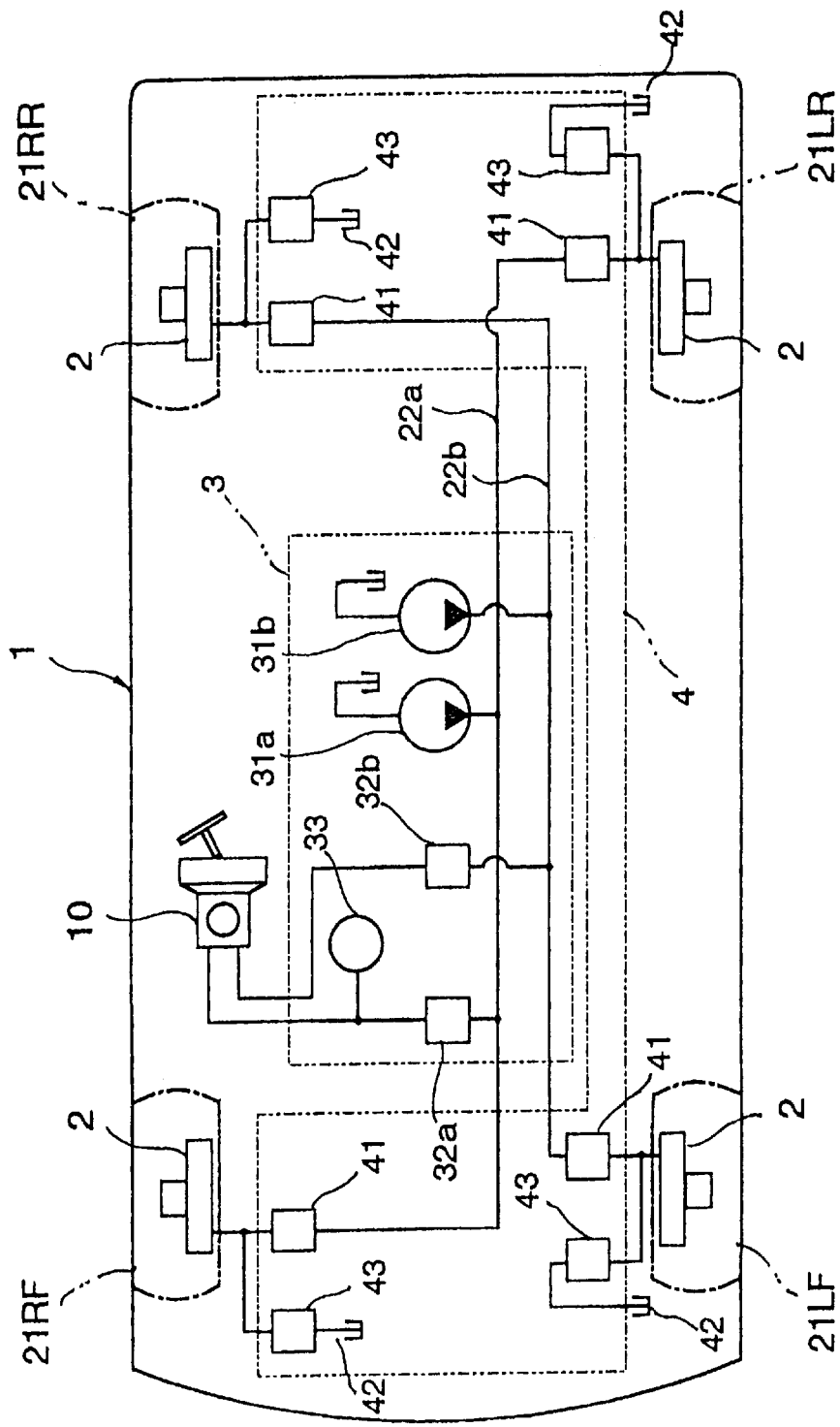
FIG. 2 is a braking pressure line installed to the automotive vehicle shown in FIG. 1.

Referring to FIG. 2 showing a braking pressure line, the braking system has what is called a cross-piping independent brake arrangement. Specifically, the brake units 2 related to the right front wheel 21RF and the left rear wheel 21LR respectively are connected to the brake master cylinder 10 through a first hydraulic line 22a. Similarly, the brake units 2 related to the left front wheel 21LF and the right rear wheel 21RR respectively are connected to the brake master cylinder 10 through a second hydraulic line 22b. The braking system applies braking force to the wheels 21RF, 21LF, 21RR and 21LR independently according to a strength with which a brake pedal 14 is stepped on by the driver. The step-on strength may be detected by a pressure sensor (not shown) or any other sensor known in the art. The pressure supply unit 3 includes hydraulic pumps 31a and 31b, connected respectively to the first and second hydraulic lines 22a and 22b, shut-off valves 32a and 32b disposed respectively in the first and second hydraulic lines 22a and 22b to connect and disconnect pressure supply between the hydraulic pumps 31a and 31b and the brake master cylinder 10, and hydraulic sensor 33 to detect pressure between the brake master cylinder 10 and the shut-off valve 32a. The stability control unit 5 controls the shut-off valves 32a and/or 32b to close to disconnect the brake master cylinder 10 from the first and second hydraulic lines 22a and 22b and to permit hydraulic pressure developed by the hydraulic pumps 31a and 31b to be applied to the brake units 2 through the distributor unit 4 independently from stepping on the brake pedal 14. The distributor unit,4 includes a brake pressure supply valve 41 and a brake pressure relief valve 43 related to each respective brake unit 2. The brake pressure supply valve 41 delivers hydraulic pressure to the brake unit 2 through the first or second hydraulic line 22a or 22b. The brake pressure relief valve 43 releases hydraulic pressure into a reservoir 42 from the brake unit 2. Hydraulic pressure remaining supplied to the brake unit 2, and hence braking force applied to the wheel, is controlled by regulating the valve opening of the brake pressure supply valve 41 or of the brake pressure relief valve 43 by the stability control unit 5.

The stability control unit 5 determines a cornering attitude of the vehicle 1 based on incoming signals from the sensors 6–9 (which comprise a vehicle state detecting means) and controls operations of the pressure supply unit 3 and the distributor unit 4 based on the determined cornering attitude. The stability control unit 5 further controls operations of the pressure supply unit 3 and the distributor unit 4 based on an incoming signal from the hydraulic sensor 33 which indicates the step-on pressure relating to the brake pedal 14.

Figure 3:
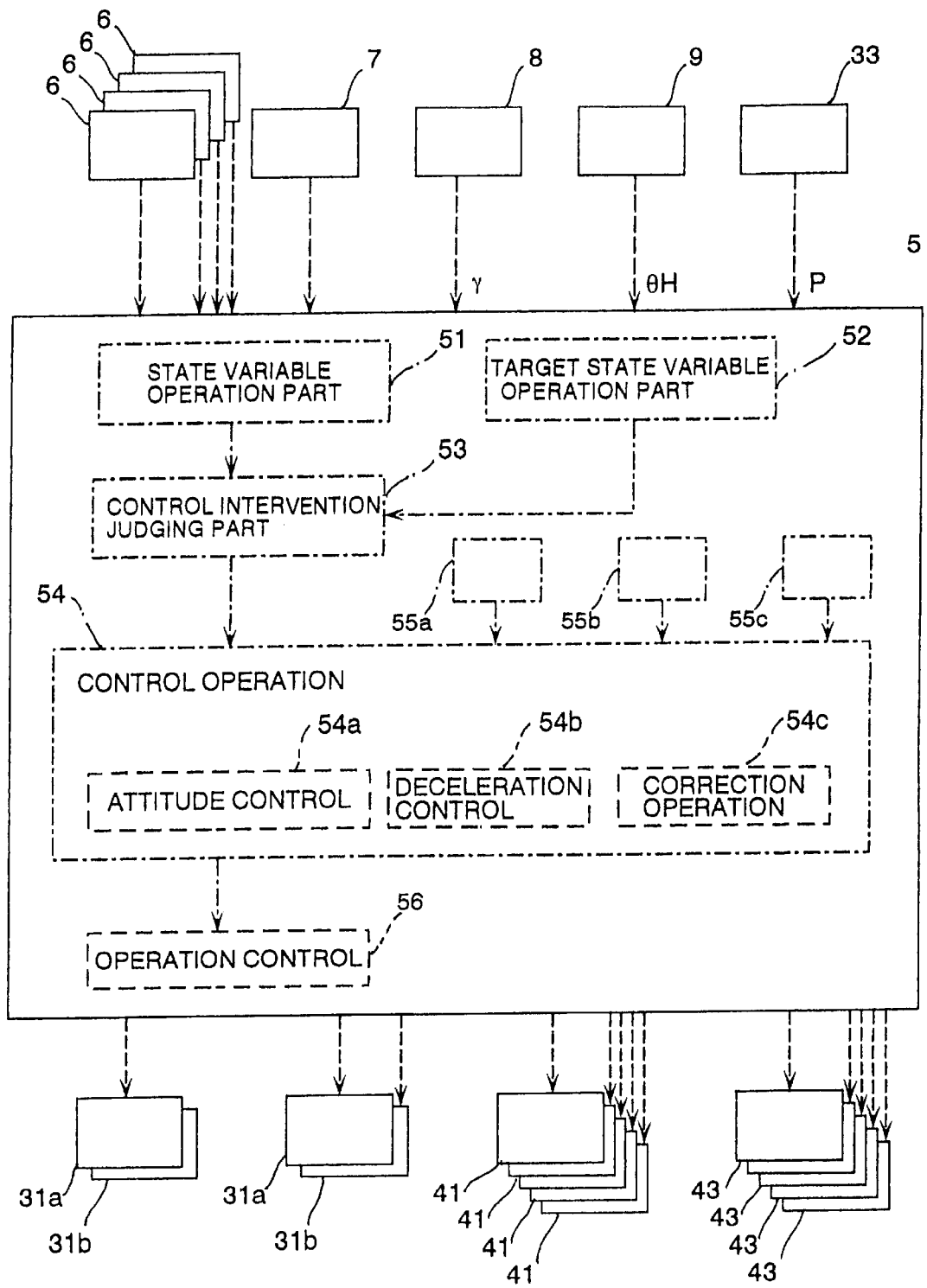
FIG. 3 is a block diagram of a stability control unit.
Figure 4:
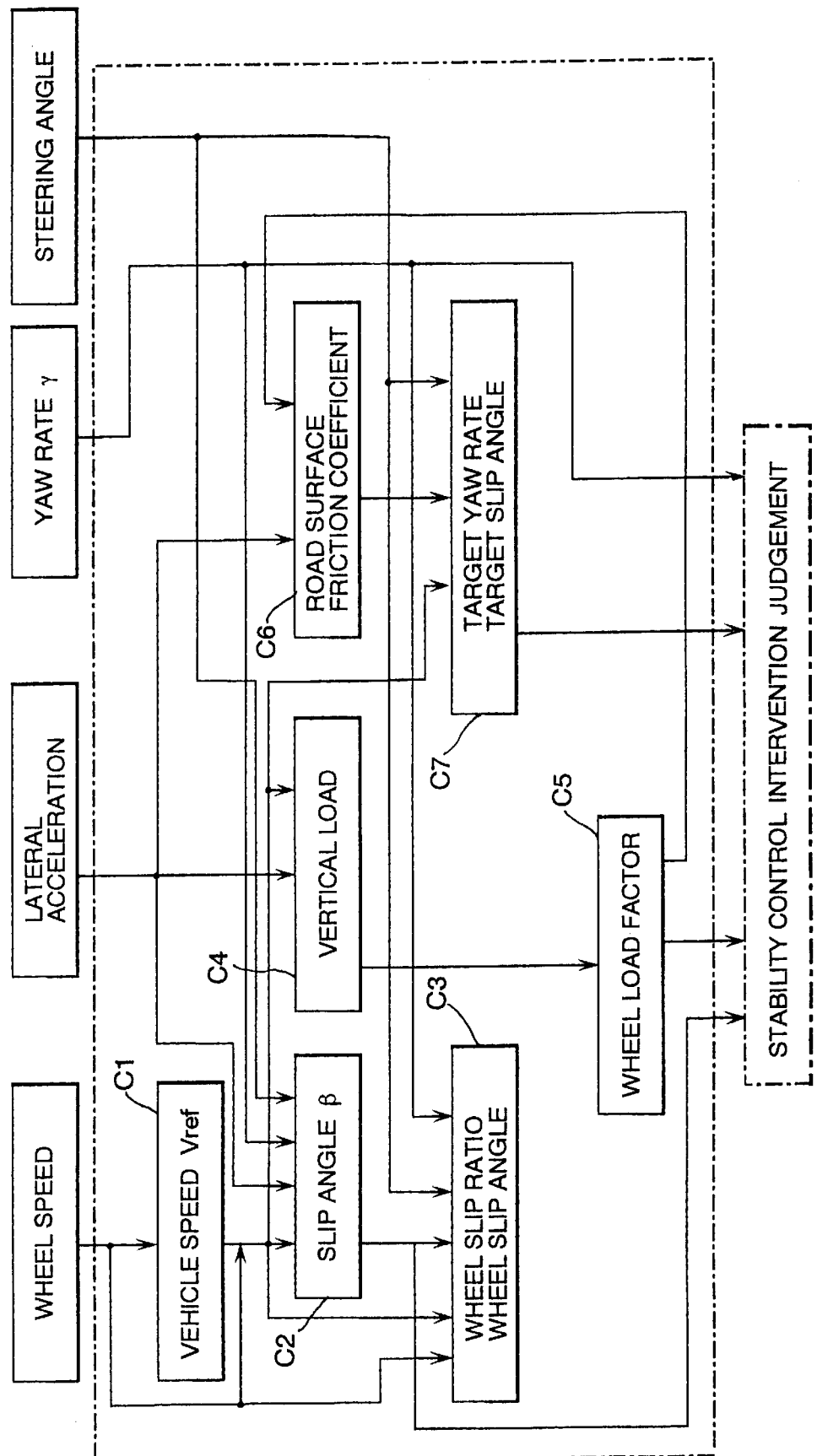
FIG. 4 is a block diagram showing calculations of actual and target parameters.

As shown in FIG. 3, the stability control unit 5 comprises a microcomputer divided into various functional parts including an attitude variable operation part 51, a target attitude variable operation part 52, a control intervention judging part 53, a control variable operation part 54, vehicle condition judging parts 55a, 55b and 55c, Wand a drive control part 56. The control variable operation part 54 comprises three sub-parts, namely a vehicle attitude control sub-part 54a, a deceleration control sub-part 54b and a critical value operation sub-part 54c. The attitude variable operation part 51 calculates a vehicle slip angle and a running speed of the vehicle 1 as attitude variables, which represent a turning attitude with respect to a running direction of the vehicle 1, based on incoming signals from the sensors 6–9. Similarly, the target attitude variable operation element 52 calculates a target vehicle slip angle and a target yaw rate of the vehicle 1 as target attitude variables for a target running direction intended by the driver. Specifically, these vehicle attitude variables are gained through a calculation process as shown in FIG. 4. A slip angle $\beta$ of vehicle is calculated as shown at block C2 based on a wheel speed of each wheel detected by the respective wheel speed sensors 6, a vehicle speed Vref calculated based on the wheel speeds as shown at block C1, a lateral acceleration detected by the gravity sensor 7, a yaw rate $\gamma$ detected by the yaw rate sensor 8 and a steering angle $\theta$H of the front wheels 21RF and 21LF. A slip ratio and a slip angle of each wheel 21RF, 21LF, 21RR, 21LR are calculated as shown at block C3 based on the wheel speed, the vehicle speed Vref, the yaw rate $\gamma$, the steering angle $\theta$H of the front wheels 21RF and 21LF, and the slip angle $\beta$. A vertical load exerted on each wheel is calculated based on the wheel speed and the lateral acceleration as shown at block C4. The rate of the present total tire gripping or adhesion force relative to the total rated tire gripping or adhesion force of the wheels is calculated as a tire load factor based on the vertical loads and the slip ratio as shown at block C5. A road surface friction coefficient (which is referred to the coefficient of friction of the tire relative to a road surface) is calculated as shown at block C6. A target yaw rate and a target slip angle are calculated based on the road surface friction coefficient, the front wheel steering angle and the vehicle speed Vref as shown at block C7. The control intervention judging part 53 calculates a deviation of the actual slip angle $\beta$ from the target slip angle and a deviation of the actual yaw rate $\gamma$ from the target yaw rate, based on which it is judged whether the stability control must intervene.

The control variable operation part 54 includes the vehicle attitude control sub-part 54a, the deceleration control sub-part 54b and the critical value-,operation sub-part 54c as was previously mentioned. The vehicle attitude control sub-part 54a performs attitude or orientation control of the vehicle 1 by applying braking force to either side of the vehicle 1 so as to produce a yaw moment about the center of gravity of the vehicle 1. The deceleration control sub-part 54b controls braking force applied to the right and left wheels to decelerate the vehicle 1. The critical value operation sub-part 54c changes a judging parameter used in drift-out restraint control which will be described later. Based on the result of the judgement of intervention made in the control intervention judging part 53, the control variable operation part 54 calculates braking force to be applied to the respective wheels 21RF, 21LF, 21RR and 21LR necessary to direct the vehicle 1 to an aimed turning direction meeting to the drivers operation. Further, the control variable operation part 54 opens either one of the shut-off valves 32a and 32b when the hydraulic sensor 33 detects hydraulic pressure P applied as braking force to the brake units 2 higher than the atmospheric pressure, bringing the brake master cylinder 10 into communication with either one of the first and second hydraulic line 22a and 22b.

The vehicle condition judging sub-part 55a detects the degree of understeering and judges whether the tendency for the vehicle 1 toward understeering is too strong to rectify the running direction in the drift-out restraint control. The vehicle condition judging sub-part 55b judges whether the vehicle speed it too high to rectify the running direction. The vehicle condition judging sub-part 55c judges whether there is caused a change in running direction during execution of the drift-out restraint control. The drive control part 56 actuates selectively the shut-off valves 32a and 32b, the brake pressure supply valve 41 and the brake pressure relief valve 43 based on the result of the calculation at the controlling element 54.

The system of driving stability control further performs, in addition to the stability control, anti-skid braking control in which an occurrence of wheel lockup is prevented by controlling braking force applied to the wheels 21RF, 21LF, 21RR and 21LR and traction control in which an occurrence of slippage is prevented by controlling drive torque applied to the wheels 21RF, 21LF, 21RR and 21LR. The stability control system gives top priority to the anti-skid braking control and coordinates the stability control and the traction control in a prescribed manner.

Figure 5:
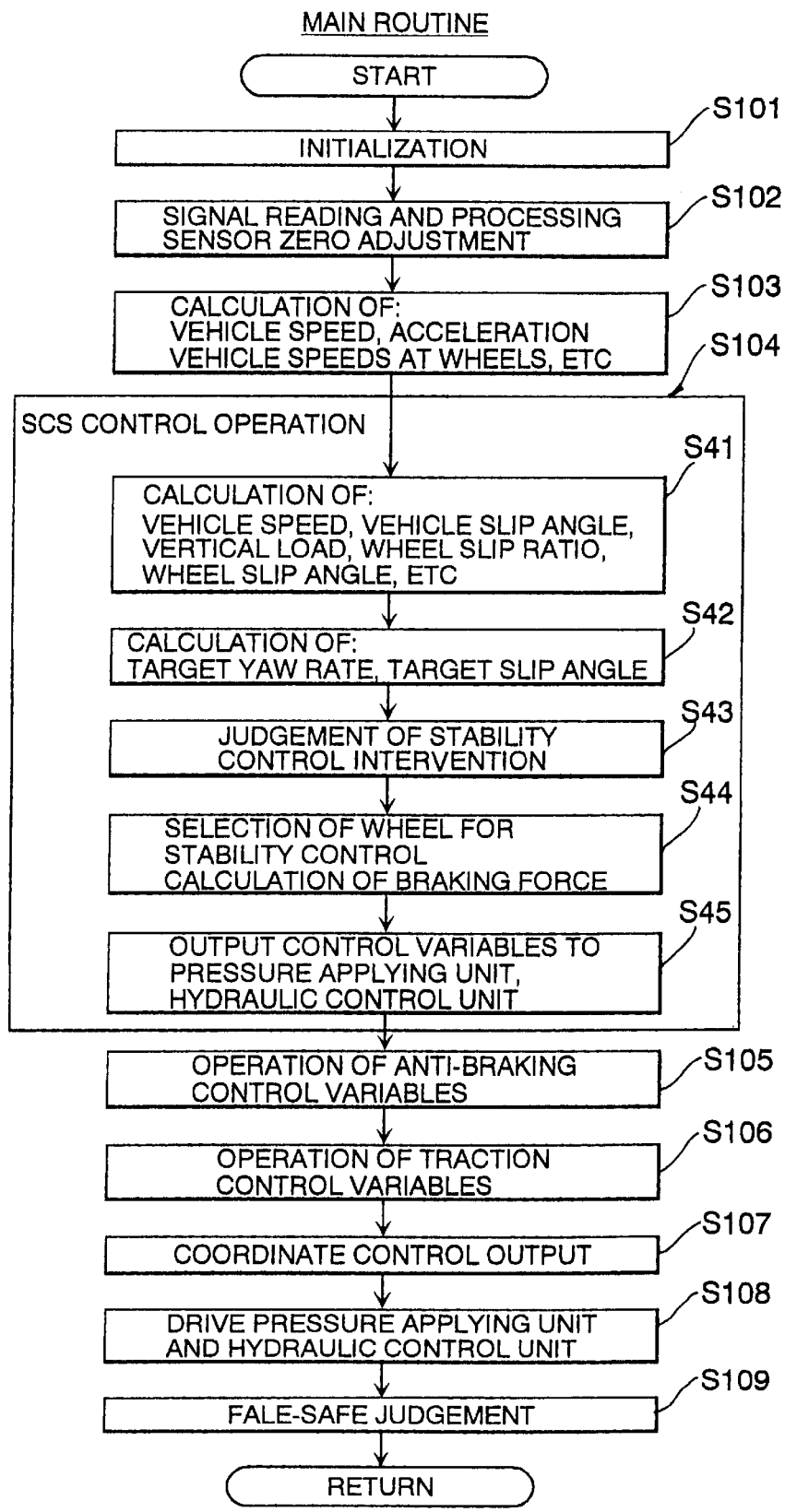
FIG. 5 is a flow chart illustrating a stability control main routine.
Figure 6:
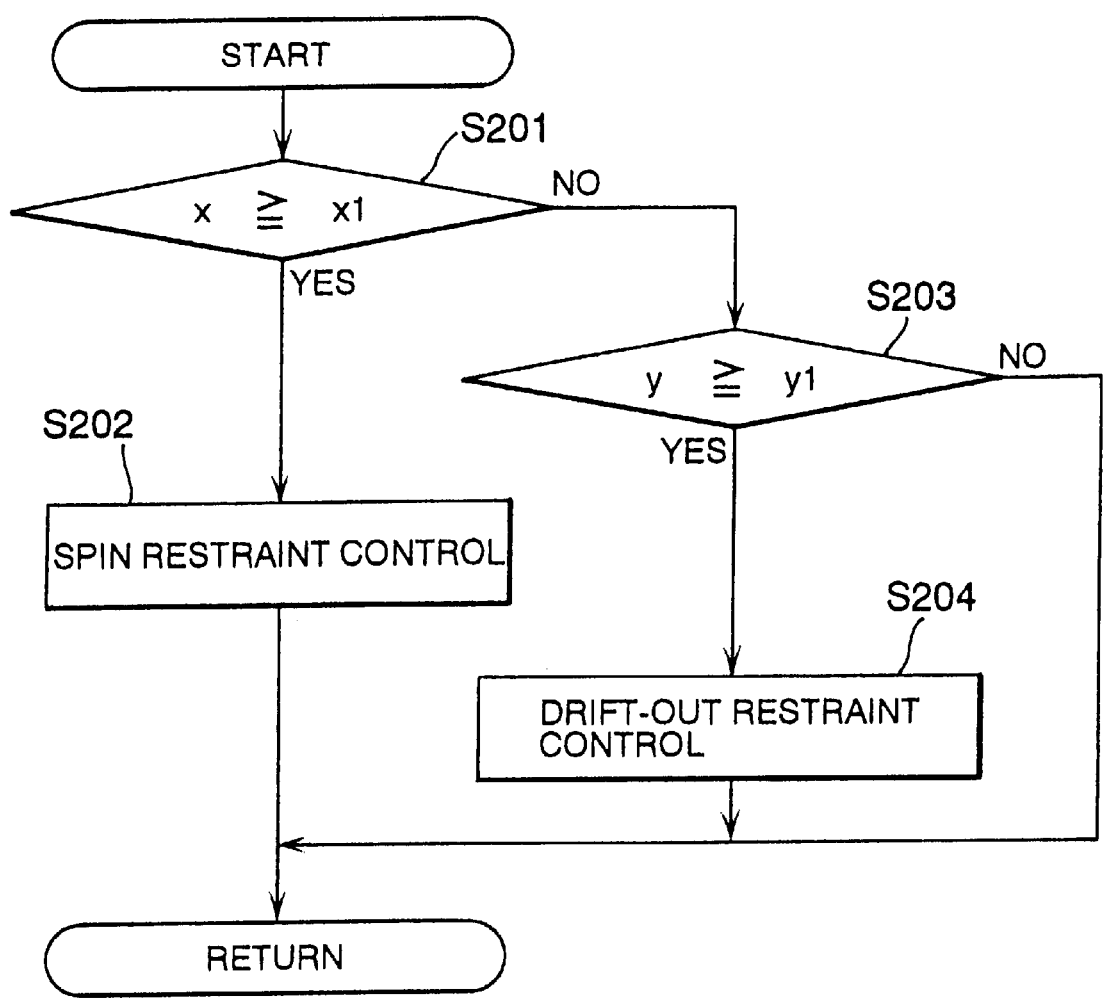
FIG. 6 is a flow chart illustrating a control intervention judging subroutine.
Figure 7:
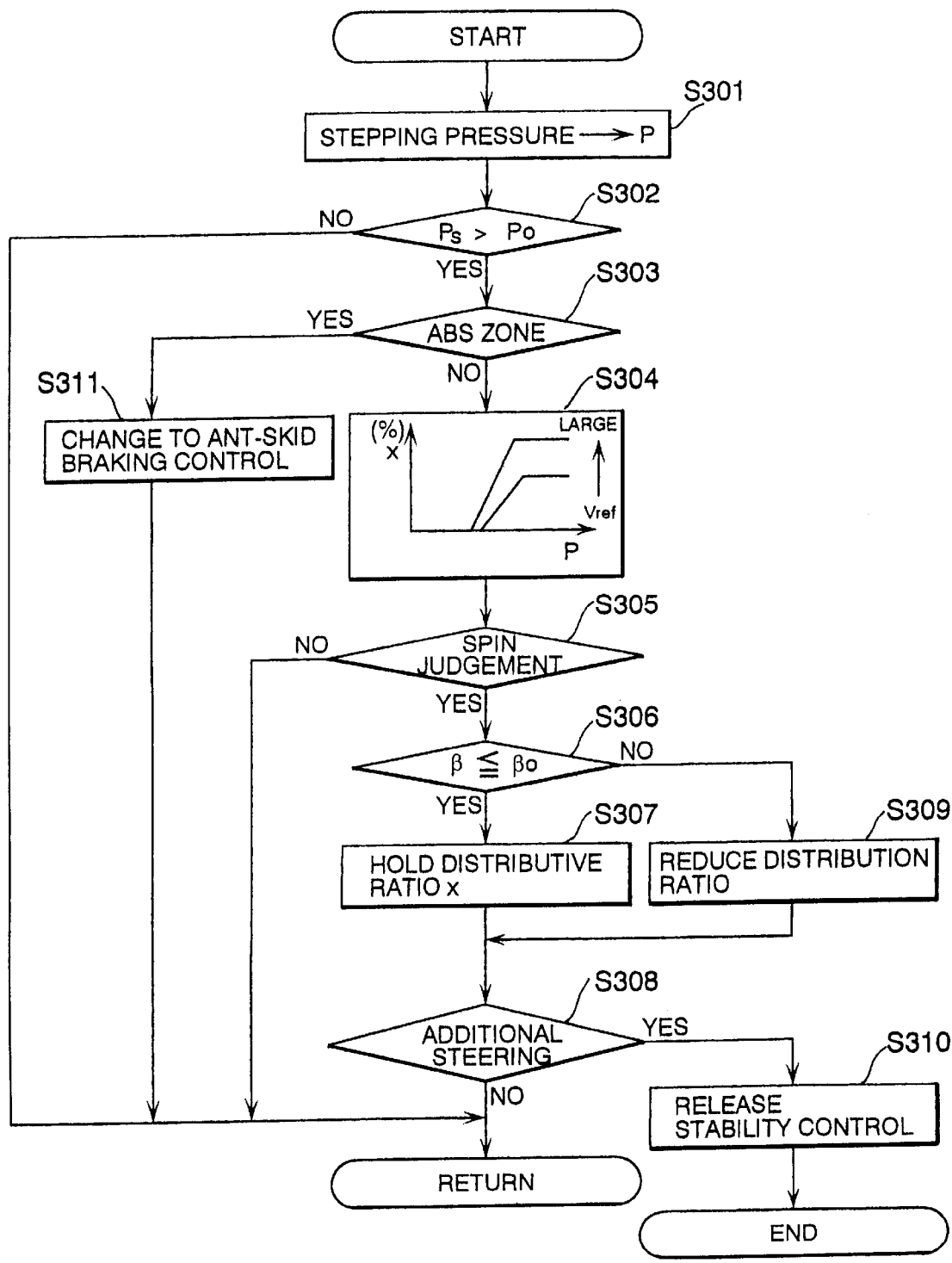
FIG. 7 is a flow chart illustrating a harmonized control routine.

The operation of the system of driving stability control depicted in FIGS. 1 through 3 will be best understood by reviewing FIGS. 5 through 7 which are flow charts illustrating various control sequence routines and sub-routines for the microcomputer of the stability control unit 5.

Referring to FIG. 5, which is a flow chart illustrating the basic control sequence routine, when an ignition switch (not shown) is turned on, the flow chart logic commences and control passes directly to step S101 where various values are initialized. Subsequently, after zero adjustment of the sensors 6–9 and 33, signals from the sensors 6–9 and 33 are input to the stability control unit 5 at step S102. Based on to the incoming signals, calculations are made to obtain a vehicle speed, a vehicle deceleration and vehicle speeds at the respective wheels as vehicle attitude variables commonly necessary for various controls including the anti-skid braking control, the stability control and the traction control at step S103. Thereafter, stability control operation is executed at step S104 which includes substeps S41 through S45. Specifically, calculations are made to find a vehicle speed Vref, a slip angle $\beta$ of the vehicle, a slip ratio and a slip angle of each wheel, a vertical load of each wheel, a tire load factor and a road surface friction coefficient at step S41 and to find a target yaw rate, a target slip angle and a target deceleration as target vehicle attitude variables at step S42. Subsequently, at step S43, a slip angle deviation and a yaw rate deviation are calculated based on these vehicle attitude variables and target vehicle attitude variables to make a judgement whether there is a necessity for a control intervention. If the control intervention is needed, selection of one or more wheels to be braked and a calculation of braking force to be applied to each selected wheel are made at step S44. The brake pressure supplying valve 41 or the brake pressure relief valves 43 is driven to open so as to meet the braking force for the brake unit 2 relating to the selected wheel at step S45. Subsequently to the stability control operation made at step S104, the anti-skid braking control operation and the traction control operation are consecutively made at steps S105 and S106, respectively. After coordinating the results of operations in the prescribed manner at step S107, the brake pressure applying valve 41 or the brake pressure relief valves 43 is driven to regulate its valve opening so as to provide braking force for each brake unit 2 according to the coordinated result at step S108. At step S109, a fail-safe routine is performed to monitor operations of the sensors 6–9 and 33. The flow chart logic orders return for another sequence routine.

FIG. 6 is a flow chart illustrating the control intervention judgement subroutine made at step S43 in the basic control sequence routine shown in FIG. 5. When the flow chart logic commences and control proceeds directly to a judgement at step S201 where the slip angle deviation x of an actual slip angle $\beta$ from the target slip angle is compared with an intervention threshold value x1. When the slip angle deviation x is equal to or greater than the threshold value x1, this indicates that the vehicle is going to spin due to an increasing tendency toward oversteering, then, the spin restraint control is executed at step S202. On the other hand, when the slip angle deviation x is less than the threshold value x1, the yaw rate deviation y of an actual yaw rate $\gamma$ from the target yaw rate is compared with an intervention threshold value y1 at step S203. When the yaw rate deviation y is equal to or greater than the threshold value y1, this indicates that the vehicle is going to drift out due to an increasing tendency toward understeering, then, the drift restraint control is executed at step S204.

FIG. 7 is a flow chart illustrating the sequence routine of the coordinated control of vehicle attitude and braking control which is executed at step S107 in the basic control sequence routine shown in FIG. 5, or otherwise may be executed at regular intervals as an interruption routine. The sequence routine shown by the flow chart in FIG. 7 is programmed on condition that the vehicle attitude control is under execution. When the flow chart logic commences and control proceeds directly to a judgement at step S301 where step-on pressure Ps developed correspondingly to pressure exerted on the brake pedal 14 by the driver is detected. Subsequently, the step-on pressure P is compared to a threshold value Po specified for execution of the coordinated control at step S302. When the step-on pressure Ps is less than the threshold value Po, this indicates that the coordinated control is unnecessary for the purpose of braking the vehicle, then, the flow chart logic returns for another execution of the coordinated control. On the other hand, when the step-on pressure P is greater than the threshold pressure Po, then, at step S303, a judgement is made as to whether the vehicle condition is within a zone for the anti-skid braking control. When the answer is affirmative, this indicates that there is a demand for braking force too strong to disregard a possible occurrence of wheel lockup, then, at step S311, the control is switched to the anti-skid braking control. However, when the answer is negative, a braking pressure distribution ratio x indicating a distributive proportion of braking force necessary to be allocated to the braking control is determined at step S304. The distribution ratio x is taken as a complementary correction value of braking force used in the stability control and increased as the step-on pressure and/or the vehicle speed become higher. As will be described later, as the distribution ratio x becomes large, the distributive proportion of braking force allocated to the braking control increases and the distributive proportion of braking force allocated to the stability control complimentarily reduces.

Subsequently, a judgement is made at step S305 as to whether there is an occurrence of a spin. When the answer is negative, the flow chart logic returns. On the other hand, when the answer is affirmative, a slip angle $\beta$ is compared with a threshold angle $\beta$ specified for providing a safety margin against spin at step S306. When the slip angle, $\beta$ is less than the threshold angle $\beta$o, this indicates that, even if a spin occurs resulting from braking, the spin is developed only to the level that it may be disregarded in terms of safety driving, then, at step S307, the distribution ratio x is held as it is. However, when the slip angle $\beta$ is equal to or greater than the threshold angle $\beta$o, this indicates that it is too great to avoid an occurrence of a spin, then, at step S308, either the braking control is abandoned by canceling the distribution ratio x (changing the distribution ratio x to zero %) or executed by distributing the braking force at a reduced distribution ratio x. After execution of the distribution of the braking force at step S307 or S308, a judgement is made at step S309 as to whether the steering wheel is additionally turned in the same direction, for example, whether the steering wheel is further turned right after having been turned right to a certain extent. When the answer is negative, the flow chart logic returns to distribute the step-on braking force to the respective wheels at the distribution ratio x held at step S307 or changed at step S308. However, when the answer is affirmative, it indicates that the steering wheel is operated with the active intention of causing a spin during, for example, sporty driving, then, at step S310, the stability control, which is obstructive to the sporty driving, is suspended. Otherwise, the stability control may be restrained by, for example, reducing a control gain. It can be said that suspension of the stability control is achieved by reducing the control gain to the lowest extremity.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A system of driving stability control for a vehicle equipped with a braking system for controlling driving stability of the vehicle according to vehicle driving conditions of applying braking force selectively and independently to respective wheels, said system of driving stability control comprising:

a master cylinder for developing braking pressure according to pedal travels by which a brake pedal is pressed down;

hydraulic pressure distribution means for distributing said braking pressure to a brake unit of each said wheel from said master cylinder therethrough;

opening/closing means disposed in said hydraulic pressure distribution means for opening said hydraulic pressure distribution means to distribute said braking pressure to said brake unit and closing said hydraulic pressure distribution means to prevent distribution of said braking pressure to said brake unit;

pressuring means installed to said hydraulic pressure distribution means downstream from said opening/closing means to pressurize said braking pressure to be supplied to said brake unit;

pressure relief means connected to said brake unit to relieve said braking pressure from said brake unit;

driving condition monitoring means for monitoring a driving condition of the vehicle;

pressure detecting means for detecting a step-on pressure which with a brake pedal is stepped on; and control means for controlling said opening/closing means so as to close said hydraulic pressure distribution means which said driving condition monitoring means detects a specified driving condition, executing driving stability control by which said pressurizing means and said pressure relief means are controlled so as to apply braking force selectively and independently to said brake units when said driving condition monitoring means detects a specified driving condition, executing coordinated braking control by which, when said pressure detecting means detects a specified step-on pressure during execution of said driving stability control, said braking pressure is delivered to said brake units according to said pedal travels while said driving stability control is continued, rectifying said driving stability control so as to make a participative degree of said driving stability control smaller while said step-on pressure is higher than said specified step-on pressure than while said step-on pressure is lower than said specifies step-on pressure, judging whether said driving condition causes a spin of the vehicle, and restraining said rectification of said driving stability control while said step-on pressure is higher than said specified step-on pressure when judging said driving condition to cause a spin of the vehicle.

2. The system of driving stability control as defined in claim 1, wherein said control means calculates a slip angle of the vehicle on the basis of said driving condition and restraining said rectification of said participative degree of said driving stability control while said step-on pressure is higher than said specified step-on pressure when judging said driving condition to cause a spin of the vehicle when said slip angle is greater than a threshold angle specified for an occurrence of a spin.

3. The system of driving stability control as defined in claim 1, wherein said control means increases a rate at which said participative degree of said driving stability control is made smaller as said step-on pressure becomes higher.

4. The system of driving stability control as defined in claim 1, wherein said control means calculates a vehicle speed on the basis of said driving condition increases a rate at which said participative degree of said driving stability control is made smaller as said vehicle speed becomes higher.

5. The system of driving stability control as defined in claim 1, wherein said control means restrains said driving stability control when judging that a steering wheel is further turned on the basis of said driving condition.

6. The system of driving stability control as defined in claim 5, wherein said control means suspends said driving stability control when judging that a steering wheel is further turned on the basis of said driving condition.

7. The stability control system as defined in claim 5, wherein said control means suspends said driving stability control and said distribution of said braking pressure according to said pedal travels while detects a driving condition falling in a range specified for execution of anti-ski braking control.

8. A system of driving stability control for a vehicle equipped with a braking system including braking units, one for each wheel, driving stability control of the vehicle according to vehicle driving conditions by applying braking force selectively and independently to said braking units, said system of driving stability control comprising:

a master cylinder for developing braking pressure according to pedal travels by which a brake pedal is pressed down;

a first hydraulic pressure distribution passage through which said braking pressure is distributed to said brake units of said front right and rear left wheels from said master cylinder therethrough;

a second hydraulic pressure distribution passage through which said braking pressure is distributed to said brake units of said front left and rear right wheels from said master cylinder therethrough;

a first cut value disposed in said first hydraulic pressure distribution passage for opening said first hydraulic pressure distribution passage to distribute said braking pressure to said brake units and closing said first hydraulic pressure distribution passage to prevent distribution of said braking pressure to said brake units;

a second cut valve disposed in said second hydraulic pressure distribution passage for opening said second hydraulic pressure distribution passage to distribute said braking pressure to said brake units and closing said second hydraulic pressure distribution passage to prevent distribution of said braking pressure to said brake units;

pressurizing valves installed to said first and second hydraulic pressure distribution passages, respectively downstream from said first and second cut valves, respectively to pressurize said braking pressure to be supplied to said brake units, respectively;

pressure relief valves connected to said brake units, respectively through which said braking pressure is relieved from said brake units, respectively;

hydraulic pumps installed to said first and second hydraulic pressure distribution passages, respectively, for supplying hydraulic pressure to said pressurizing valves;

a vehicle speed sensor;

a yaw rate sensor;

a steering angle sensor;

a lateral acceleration sensor;

a pressure sensor for detecting a step-on pressure with which a brake pedal is stepped on; and a control unit comprising a microcomputer for controlling said first and second cut valve, said pressurizing valves, said relief valves and said hydraulic pumps on the basis values detected by said vehicle speed sensor, said yaw rate sensor, said steering angle sensor, said lateral acceleration sensor and said pressure sensor, performing, when a deviation between a target yaw rate determined on the basis of said value detected by said steering angle sensor and a yaw rate detected by said yaw rate sensor is greater than a specified threshold deviation, said driving stability control, by regulating valve openings of said pressurizing valve and said pressure relief valve of each said brake unit simultaneously with closing both said first and second cut valves, rectifying, when said step-on pressure is higher than a specified step-on pressure, said driving stability control by opening either one of said first and second cut valves so as to make a participative degree of said driving stability control smaller while said step-on pressure is higher than said specified step-on pressure than while said step-on pressure is lower than said specified step-on pressure, and restraining said rectification of said driving stability control when a driving condition is judged on the basis of said values detected by said vehicle speed sensor, said yaw rate sensor and said steering angle sensor to cause a spin of the vehicle.

9. The system of driving stability control as defined in claim 8, wherein said control unit restrains said rectification of said driving stability control when a slip angle of the vehicle that is determined on the basis of said values detected by said vehicle speed sensor, said yaw rate sensor and said steering angle sensor is greater than threshold slip angle specified for an occurrence of a spin of the vehicle.

10. The system of driving stability control as defined in claim 8, wherein said control unit increases a rate at which said participative degree of said driving stability control is made smaller as said step-on pressure becomes higher.

11. The system of driving stability control as defined in claim 8, wherein said control unit increases increases a rate at which said participative degree of said driving stability control is made smaller as a vehicle speed detected by said vehicle speed sensor becomes higher.

12. The system of driving stability control as defined in claim 8, wherein said control units restraints said driving stability control when judging a steering wheel is further turned on the basis of said driving condition.

* * * * *